(12) United States Patent
Malaschewski

(10) Patent No.: US 8,578,604 B2
(45) Date of Patent: Nov. 12, 2013

(54) METHOD OF ATTACHING A REPAIR PLATFORM TO A WIND TURBINE

(75) Inventor: Markus Malaschewski, Schafflund (DE)

(73) Assignee: LM Wind Power A/S, Kolding (DK)

( * ) Notice: Subject to any disclaimer, the term of this patent is extended or adjusted under 35 U.S.C. 154(b) by 9 days.

(21) Appl. No.: 13/358,208

(22) Filed: Jan. 25, 2012

(65) Prior Publication Data

US 2012/0192400 A1  Aug. 2, 2012

(30) Foreign Application Priority Data

Jan. 28, 2011  (EP) .................................... 11152475

(51) Int. Cl.
*B23P 6/00* (2006.01)
(52) U.S. Cl.
USPC .......................................... 29/889.1; 182/142
(58) Field of Classification Search
USPC .............. 29/889.1, 889.2, 428; 182/142, 145, 182/150, 128, 129
See application file for complete search history.

(56) References Cited

U.S. PATENT DOCUMENTS

| | | | |
|---|---|---|---|
| 7,537,087 B2* | 5/2009 | May | 182/142 |
| 7,740,107 B2* | 6/2010 | Lemburg et al. | 182/142 |
| 8,083,029 B2* | 12/2011 | Teichert | 182/128 |
| 2011/0173811 A1* | 7/2011 | Iversen | 29/889.1 |
| 2011/0303488 A1* | 12/2011 | Besselink et al. | 182/142 |

FOREIGN PATENT DOCUMENTS

| | | |
|---|---|---|
| DE | 197 26 408 C1 | 3/1999 |
| DE | 20 2004 016 460 U1 | 12/2004 |
| DE | 10 2008 019 680 A1 | 11/2009 |
| WO | 2004/081373 A2 | 9/2004 |

OTHER PUBLICATIONS

European Search Report in the counterpart EP Application No. 11152475.7, dated Jun. 21, 2011, four (4) pages.

* cited by examiner

*Primary Examiner* — David Bryant
*Assistant Examiner* — Ryan J Walters
(74) *Attorney, Agent, or Firm* — Nath, Goldberg & Meyer; Jerald L. Meyer; Sanjana Mangalagiri

(57) ABSTRACT

The method comprises positioning a first blade (10A) in substantially vertical position, connecting first ends of a first and a second cable section (24, 26), respectively, with a structure included by the nacelle (6), connecting second ends (30) of the first and the second cable section (24, 26), respectively, with the repair platform (18) and lifting the repair platform along said blade (10A) by means of the first and second cable sections (24, 26). The first and second cable sections (24, 26) are positioned so that they extend over the hub (8) and are supported at a distance from each other between root regions (16) of a second and a third blade (10B, 10C), respectively.

18 Claims, 4 Drawing Sheets

METHOD OF ATTACHING A REPAIR PLATFORM TO A WIND TURBINE

Figure 1:
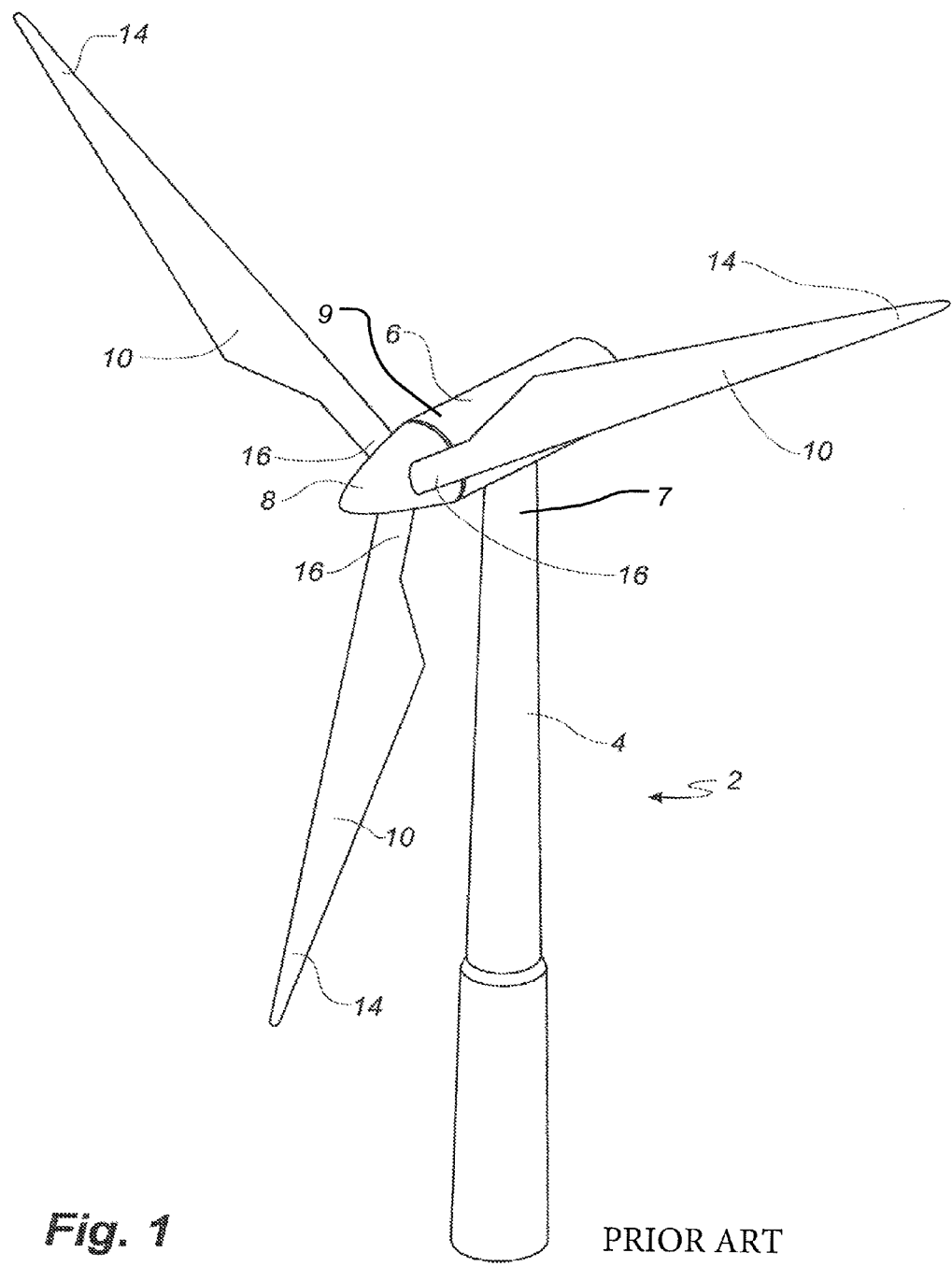

This is a Non-Provisional Application claiming the benefit from European Application No. 11152475.7, filed Jan. 28, 2011, the entire content of which is hereby incorporated by reference in its entirety.

The present invention relates to a method of attaching a repair platform to a wind turbine, the wind turbine comprising a tower, a nacelle arranged at a top end of the tower and including a structure, a hub connected to a substantially horizontal rotor shaft and being located at a front end of the nacelle and at least three wind turbine blades each having a root region connected to the hub, the method comprising positioning a first blade in substantially vertical position, connecting first ends of a first and a second cable section, respectively, to the structure, connecting second ends of the first and the second cable section, respectively, to the repair platform and lifting the repair platform along said blade by means of the first and second cable sections.

WO 2004/081373 discloses a maintenance platform for servicing rotor blades of wind power plants. The maintenance platform is suspended by means of support cables, of which a first cable is suspended from a connection device fastened to the tip of the hub, and of which a second and a third cable is suspended from the bottom of the nacelle. However, this method of suspending a maintenance platform is complicated, as a dedicated connection device must be fastened to the tip of the hub, and anchorage points must be provided at the bottom of the nacelle.

The object of the present invention is to provide a method of attaching a repair platform to a wind turbine, whereby the method is simpler and faster than known methods of attaching such platforms to a wind turbine.

In view of this object, the method is characterized by positioning the first and second cable sections so that they extend over the hub and are supported at a distance from each other between root regions of a second and a third blade, respectively.

In this way, the first and second cable sections may be extended from the front of the hub without the need for any special connection devices, as the first end of each cable section may easily be connected directly to any suitable existing structure included by the nacelle, such as an eyebolt of the gearbox or the like. There is no need for the provision of specially adapted anchoring points, as there are no special requirements to the positions of the anchoring points on the nacelle. By positioning the first and second cable sections so that they extend over and is supported at a distance from each other between root regions of a second and a third blade, respectively, each cable section may be supported in a stable position, as the cable sections, when loaded, may seek to a relatively lower position at either side of a top point of the periphery of the hub, thereby being prevented from sideward swinging.

In an embodiment, the first and second cable sections are positioned so that they are supported at the root regions of the second and the third blade, respectively. Thereby, each cable section may be supported in a further stable position, as the cable sections, when loaded, may seek to a relatively lower position between the top point of the periphery of the hub and an obliquely upward extending root region of the blade or a root region mount of the hub itself, thereby being further prevented from sideward swinging.

In an embodiment, the first and second cable sections are positioned so that they are supported directly on a peripheral surface of the hub. For many standard hub embodiments, this may be a preferred support position for the cable sections.

In an embodiment, the first and second cable sections are positioned so that they are supported directly on a surface of the root region of the second and the third blade, respectively. Especially for hub embodiments, wherein the root region of the blades extends directly from a peripheral surface of the hub, this may be a preferred support position for the cable sections.

In an embodiment, the first and second cable sections are positioned so that they are supported directly on a surface of a second and a third root region mounting connection of the hub, respectively. For hub embodiments, wherein root region mounting connections of the hub extend a distance out from a peripheral surface of the hub, this may be a preferred support position for the cable sections.

In an embodiment, the second ends of the first and second cable sections, respectively, are connected to a ring connected with the repair platform by means of at least one wire. By connecting the second ends of the first and second cable sections, respectively, to a ring, a very stable configuration may be obtained, as the ring may connect the two cable sections in a V-configuration. By further connecting the ring with the repair platform by means of a wire, the length of the cable sections in relation to the length of the wire may be adjusted in order to optimize stability of the entire suspension of the repair platform.

The ring provides an easy way of connection, as the cable sections and the wire may be simply and fast connected with the ring, for instance by means of sling hooks.

By connecting the ring with the repair platform by means of two wires, extra safety may be provided.

The ring is preferably positioned at the top end of the tower and below the hub, whereby particularly good stability of the entire suspension of the repair platform may be obtained.

The ring may in addition be positioned at a root region of the first blade in substantially vertical position.

In an embodiment, the ring is provided with a first and a second wire each having first ends fixed to the ring and second ends provided with a connection mechanism, such as a sling hook, by means of which the connection between the second ends of the first and second cable sections, respectively, and the ring is established.

In an embodiment, the ring connected with the repair platform by means of a wire is lifted from the ground to the top end of the tower by means of a hoisting device, such as a winch and a rope, in order to connect the second ends of the first and second cable sections, respectively, to the ring.

In an embodiment, the second ends of the first and second cable sections, respectively, are slung over a blade at either side of the hub so that part of the cable sections are positioned at the root regions of the second and third blades, respectively, and subsequently, the second ends of the first and second cable sections, respectively, are connected to the ring, thereby positioning the ring hanging in a position under the hub. Thereby, the cable sections may easily be positioned on the hub by a person standing on the nacelle, without the need for climbing on the hub. In the case of the hub being provided with three blades, the second and third blade will be directed obliquely upwards, so that the cable sections may slide downwards on a blade to a position at the hub and at the root section. Depending on the construction of the wind turbine, access to the downwardly hanging second ends of the first and second cable sections, in order to connect these to the ring, may be obtained by opening a hatch or the like arranged in the nacelle or in a surface of the hub. However, the connection between the second ends of the first and second cable sections and the ring may be performed in any suitable way.

In an embodiment, the second ends of the first and second cable sections, respectively, are maintained at the top of the nacelle as central parts of both the first and second cable sections, respectively, are slung over a blade at either side of the hub so that said central parts of the cable sections are positioned at the root regions of the second and third blades, respectively, whereby, before or after slinging said central parts of the cable sections, the second ends of the first and second cable sections, respectively, are connected to the ring connected with the repair platform by means of a wire, and, after slinging said central parts of the cable sections, the ring is slung over the hub, thereby positioning the ring hanging in a position under the hub.

Thereby, there may be no need to obtain access to the downwardly hanging second ends of the first and second cable sections in order to connect these to the ring. This may especially be an advantage, if the construction of the wind turbine does not permit easy access to this area, or this may simply save time. The central parts of the cable sections may easily be positioned on the hub by a person standing on the nacelle, without the need for climbing on the hub. In the case of the hub being provided with three blades, as mentioned above, the second and third blade will be directed obliquely upwards, and thereby the central parts of the cable sections may slide downwards on a blade to a position at the hub and at the root section.

In an embodiment, the first ends of the first and second cable sections, respectively, are connected with the structure before that part of the cable sections are positioned at the root regions of the second and third blades, respectively. This may be a practical procedure, as part of the cable sections may readily be slung over the nacelle without having to manually hold the first ends of the first and second cable sections.

In an embodiment, the ring has the form of a solid steel ring and is accompanied by a wire ring to which the first ends of the first and second wires, respectively, are also fixed, and which is also connected with the repair platform by means of the at least one wire. Thereby, further safety may be added to the suspension of the repair platform; if the ring should brake, the wire ring will ensure the connection between the first and second cable sections and the at least one wire and thereby carry the platform.

In an embodiment, the first and second cable sections are lead through a door opening in a roof of the nacelle or through an open nacelle roof in general in order to connect the first ends of the first and second cable sections with the structure. Thereby, a structure within a housing of the nacelle may serve as an anchoring point for a cable section.

In an embodiment, the structure is a gear box, a generator or a nacelle frame and whereby, preferably, the first cable section is connected to a first anchorage point of the gear box, generator or nacelle frame and the second cable section is connected to a second anchorage point of the gear box, generator or nacelle frame.

In an embodiment, the first and second cable sections have the form of textile slings, wires or belts, such as nylon wires or belts. Thereby, the cable sections may be relatively light and therefore easily be slung over the blades by a person.

Figure 2A:
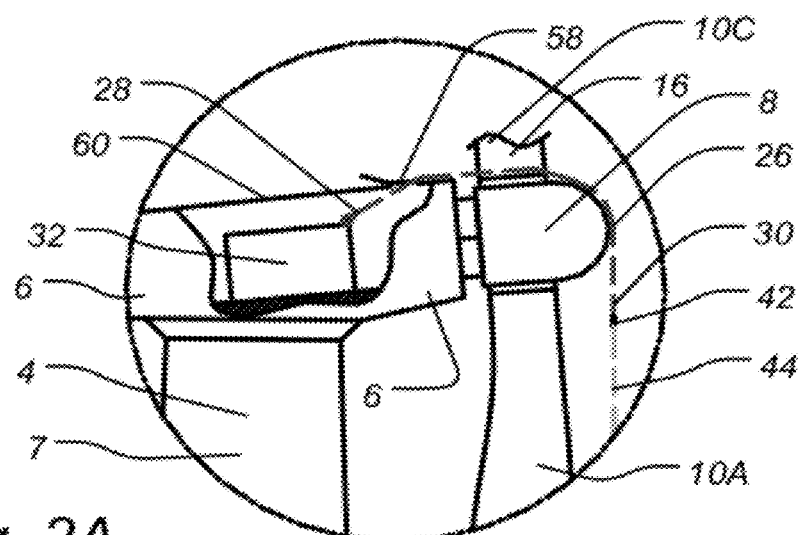
Figure 2:
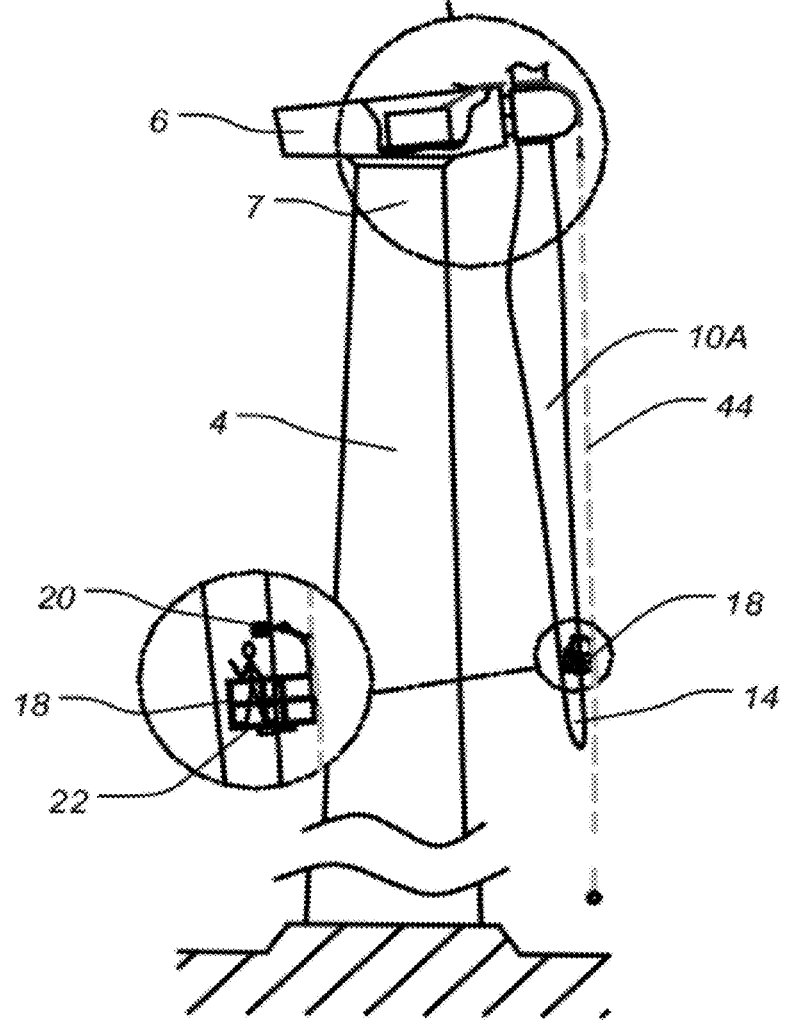
Figures 3, 3A:
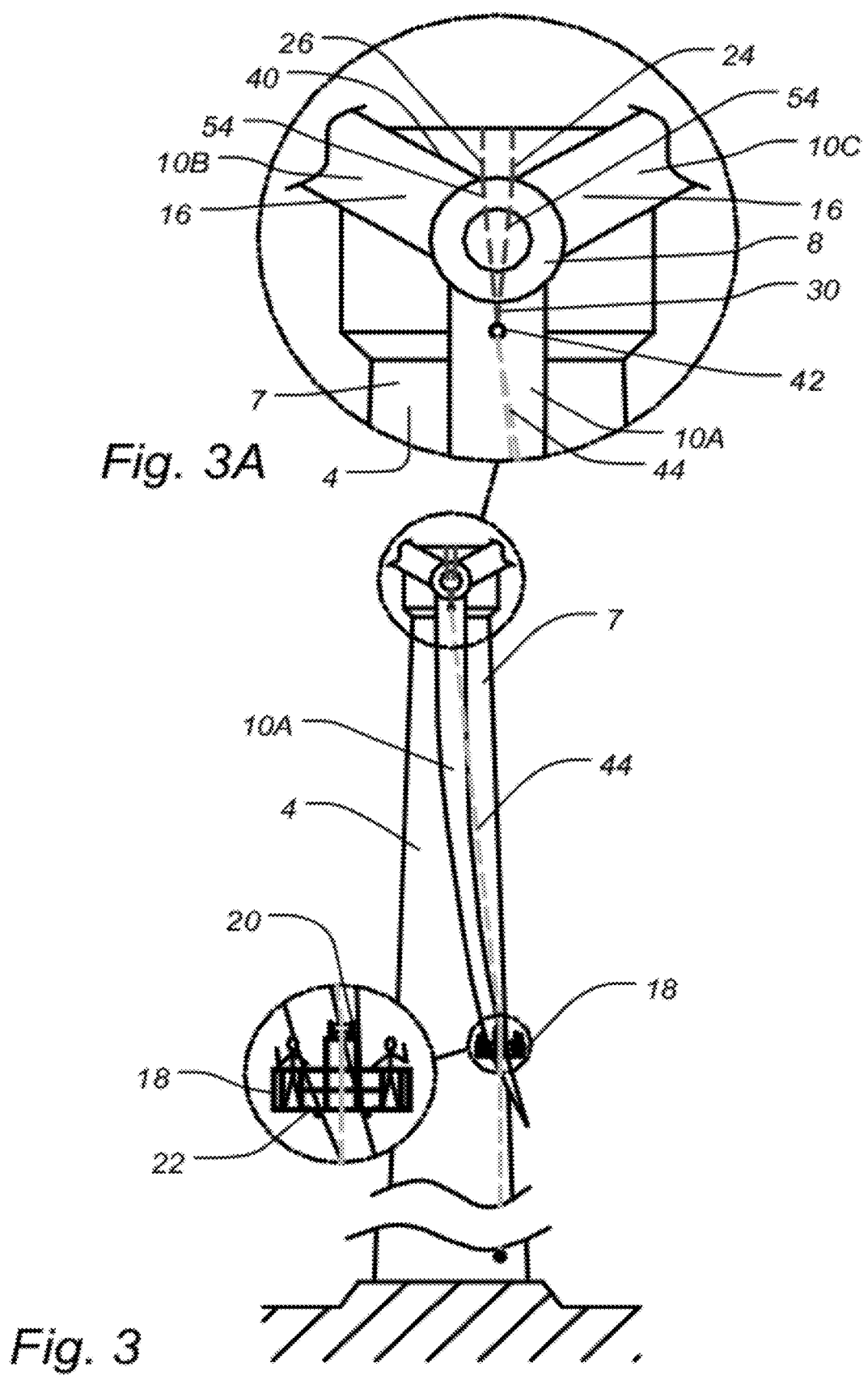
Figure 4:
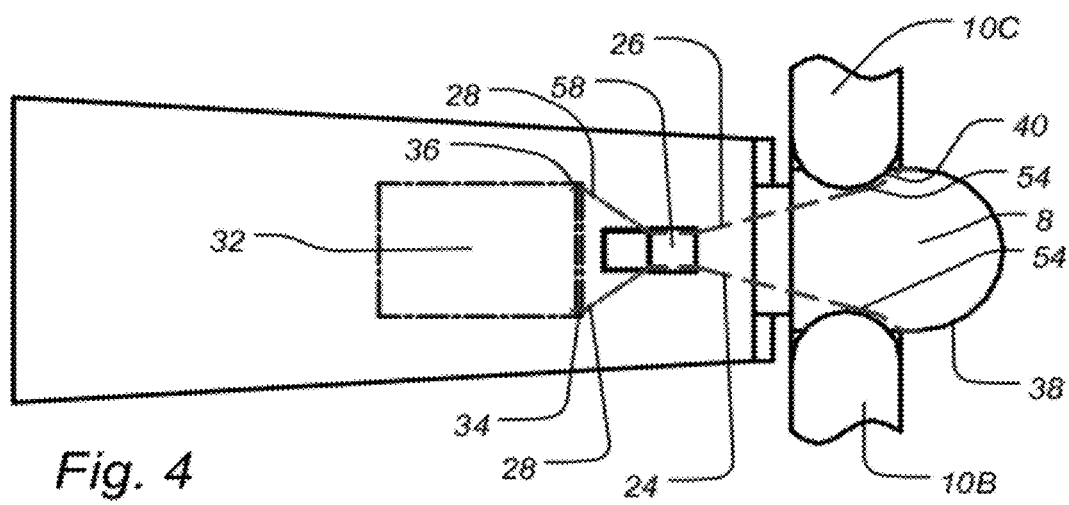
Figure 5:
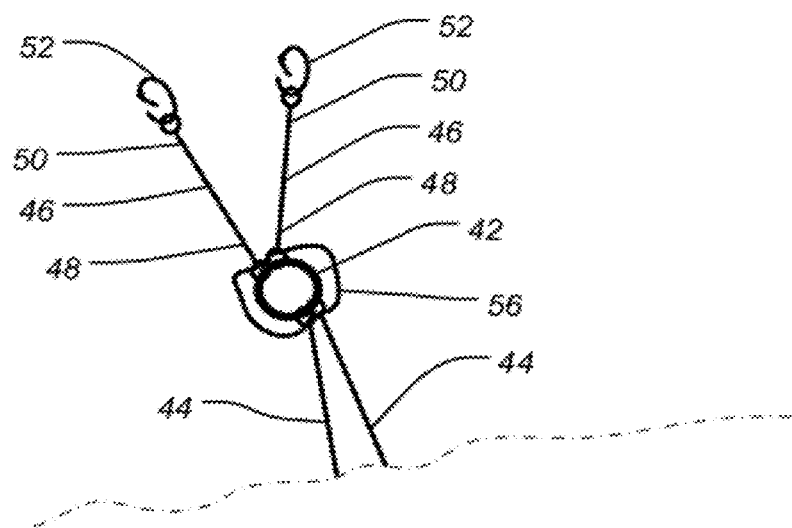

The invention will now be explained in more detail below by means of examples of embodiments with reference to the very schematic drawing, in which FIG. 1 is a perspective view of a conventional wind turbine, FIG. 2 is a side view of a repair platform attached to a wind turbine, whereby part of the blades has been cut away for illustrative purposes, FIG. 2A shows, on a larger scale, a detail of FIG. 2, FIG. 3 is a front view of the repair platform attached to a wind turbine shown in FIG. 2, FIG. 3A shows, on a larger scale, a detail of FIG. 3, FIG. 4 is a top view of the repair platform attached to a wind turbine shown in FIG. 2, and FIG. 5 shows a ring with accessories for connection of cable sections with wires.

FIG. 1 illustrates a conventional modern upwind wind turbine according to the so-called "Danish concept" with a tower 4, a nacelle 6 arranged at a top end 7 of the tower and a rotor with a substantially horizontal rotor shaft (not shown). The rotor includes a hub 8 connected to the rotor shaft and three blades 10 extending radially from the hub 8, each having a root region 16 connected to the hub 8 and a tip region 14 furthest from the hub 8. The hub 8 is located at a front end 9 of the nacelle 6.

FIGS. 2 to 4 illustrate a method of attaching a repair platform 18 to a wind turbine of the type shown in FIG. 1. However, the method according to the invention is equally applicable to other types of wind turbine having a substantially horizontal rotor shaft.

Following the method according to the invention, a first blade 10A is positioned in substantially vertical position as shown in the figures, and preferably, the rotor is braked, so that the repair platform 18 may be lifted vertically along said blade 10A. Preferably, the repair platform is provided with a fork-like structure 20 that may surround the blade 10A at least partly and slide along the blade as the repair platform 18 is lifted. Thereby, the blade 10A provides a guide for the repair platform 18 so that it does not swing from side to side during operation. Furthermore, it may be an advantage that the repair platform 18 follows the blade closely, so that the surface of the blade may easily be reached by service personnel working on the repair platform 18. A floor 22 of the repair platform 18 may also preferable be U-formed or the like, so that it may surround the blade 10A at least partly and preferably also slide along the blade. The inner sides of the fork-like structure 20 as well as the inner sides of the possibly U-formed floor of the repair platform may be provided with rollers and/or a relatively soft material in order to facilitate sliding on the blade 10A. Furthermore, in a well-known manner, the fork-like structure 20 as well as the possibly U-formed floor of the repair platform may be composed by hinged parts, so as to be able to adapt to the cross-section of different wind turbine blades and to the cross-section of the actual blade 10A at different height positions. The repair platform 18 may be adapted to follow the wind turbine blade 10A in other suitable ways than by the examples given above without departing from the scope of this invention.

According to the invention, first ends 28 of a first and a second cable section 24, 26 are connected with a structure 32, the nacelle 6 including said structure 32, and second ends 30 of the first and the second cable section 24, 26, respectively, are connected with the repair platform 18 in order to lift the repair platform along the substantially vertically positioned blade 10A as described above by means of the first and second cable sections. In the embodiments shown in the figures, the second cable section 24, 26, respectively, are connected with the repair platform 18 by means of a ring 42 and wires 44, but the cable sections 24, 26 may be connected with the repair platform 18 in other suitable ways, for instance directly. As it may be seen, especially in FIGS. 2A, 3A and 4, the first and second cable sections 24, 26 are positioned so that they extend over the hub 8 and are supported at a distance from each other between root regions 16 of a second and a third blade 10B, 10C, respectively. In the embodiment shown in the figures, the structure 32 included by the nacelle 6 is a gear box. The first cable section 24 is connected to a first anchorage point 34 of the gear box, and the second cable section 26 is connected to a second anchorage point 36 of the gear box at a distance from the first anchorage point 34, see FIG. 4. However, the first and second anchorage points 34, 36 need not be spaced. The first and second cable sections 24, 26 may have the form of textile wires or belts, such as nylon wires or belts, whereby the hub 8 may be protected from scratches.

As seen in FIGS. 2A and 4, the first and second cable sections 24, 26 are lead through a door opening 58 in a roof 60 of the nacelle 6 in order to connect the first ends 28 of the first and second cable sections 24, 26 with the structure 32. However, the first and second cable sections 24, 26 may also be lead to the structure 32 in any other suitable way, for instance through bores in a wall or the roof of the nacelle. The first ends 28 of the first and second cable sections 24, 26 may be fixed to any suitable structure inside the nacelle and may alternatively be fixed to a structure outside the nacelle, such as eyebolts mounted on a wall or the roof of the nacelle. Preferably, an existing structure is used so that it is avoided to mount a dedicated structure for the fixation.

Depending on the actual construction of the hub 8 and of the connection between the root region of the blades and the hub, the best position for the first and second cable sections 24, 26 may vary to some extent. In general, however, it is preferred that the first and second cable sections 24, 26 are positioned so that they are supported at the root regions 16 of the second and the third blade 10B, 10C, respectively, so as it is illustrated in FIG. 4. That does not mean, however, that they will necessarily touch the root regions 16 of the blades, although they may very well do so. On the other hand, they may just be positioned relatively close to the root regions 16 so that the cable sections 24, 26 are prevented from moving too much from side to side. Thereby, a stable support for the repair platform 18 may be obtained. Preferably, the first and second cable sections 24, 26 are positioned so that they are supported directly on a peripheral surface 38 of the hub 8.

In the embodiment shown in FIG. 4, the first and second cable sections 24, 26 are positioned so that they are supported directly on a surface 40 of the root region 16 of the second and the third blade 10B, 10C, respectively.

In a not shown, however well-known, embodiment of the hub 8, the hub comprises root region mounting connections for each blade 10A, 10B, 10C, wherein said root region mounting connections extend from the peripheral surface 38 of the hub. When the method according to the invention is applied to such an embodiment of the hub, the first and second cable sections 24, 26 may be positioned so that they are supported directly on or at least are able to touch a surface of a second and a third root region mounting connection of said hub, respectively. The skilled person will easily understand this procedure.

As best seen in FIG. 3A, the second ends 30 of the first and second cable sections 24, 26, respectively, are connected to a ring 42 connected with the repair platform 18 by means of two wires 44. The ring 42 is positioned at the top end 7 of the tower 4 and below the hub 8, but may, however be positioned lower than shown in the figures.

As seen in FIG. 5, the ring 42 may be provided with a first and a second wire 46 each having first ends 48 fixed to the ring 42 and second ends 50 provided with a connection mechanism 52, such as a sling hook, by means of which the connection between the second ends 30 of the first and second cable sections 24, 26, respectively, and the ring 42 may be established. The second ends 30 of the first and second cable sections 24, 26 may be provided with not shown connection loops or the like with which said connection mechanisms 52 may engage. The wires 44 may, for instance, be connected to the ring 42 by means of sling hooks or the like.

The procedure of positioning and connecting the various cable sections, wires, ring, among others, may vary, and the steps of the procedure may be performed in different orders, as described in the following.

It may be preferred to connect the first ends 28 of the first and second cable sections 24, 26, respectively, with the structure 32 before positioning part of the cable sections 24, 26 at the root regions 16 of the second and third blades 10B, 10C, respectively. Thereby, it may be ensured that the cable sections are not dropped during the procedure.

According to an embodiment of the procedure, a person, for instance standing on the nacelle 6, may sling the second ends 30 of the first and second cable sections 24, 26, respectively, over a blade 10B, 10C at either side of the hub 8 so that part of the cable sections 24, 26 are positioned at the root regions 16 of the second and third blades 10B, 10C. Thereby, by slinging the first and second cable sections 24, 26 over the blades, these may slide downwards on the blades to a position at the root region 16, thereby being positioned adequately. Subsequently, the second ends 30 of the first and second cable sections 24, 26, respectively, may be connected to the ring 42, thereby positioning the ring 42 hanging in a position under the hub 8. The ring 42 may be lifted from the ground to the top end 7 of the tower 4 by means of a not shown hoisting device, such as a winch and a rope, in order to connect the second ends 30 of the first and second cable sections 24, 26, respectively, to the ring 42. In order to access the downwardly hanging second ends 30 of the first and second cable sections 24, 26 to connect these with the ring 42, a hatch or the like arranged in the nacelle 6 or in a surface of the hub 8 may be opened.

According to another embodiment of the procedure, the second ends 30 of the first and second cable sections 24, 26, respectively, are maintained at the top of the nacelle as central parts 56, possibly folded at the middle, of both the first and second cable sections 24, 26, respectively, are slung over a blade at either side of the hub, for instance, by a person standing on the nacelle 6. The second ends 30 may be maintained at the top of the nacelle 6, for instance by tying them temporarily to a structure of the nacelle, or for instance by a person holding them. Preferably, the first ends 28 of the first and second cable sections 24, 26, respectively, are connected with the structure 32 included by the nacelle 6 before slinging the central parts 56 of the cable sections. Said central parts 56 of the cable sections are slung so that they are positioned at the root regions 16 of the second and third blades 10B, 10C, respectively, which may happen by slinging the central parts 56 over a blade at either side of the hub so that said central parts 56 slide downwards on the blades to a position at the root region 16, thereby being positioned adequately. Before or after slinging said central parts 56 of the cable sections, the second ends 30 of the first and second cable sections 24, 26, respectively, are connected to the ring 42 that is already connected with the repair platform 18 by means of wires 44, and, after slinging said central parts 56 of the cable sections 24, 26, the ring 42 is slung over the hub 8, thereby positioning the ring 42 hanging in a position under the hub. In this way, the configuration shown in FIGS. 2 to 4 may be obtained in an easy way.

The ring may have the form of a solid steel ring 42, and, as seen in FIG. 5, it may be accompanied by a wire ring 56 to which the first ends 48 of the first and second wires 46, respectively, are also fixed, and which is also connected with the repair platform 18 by means of the wires 44.

The invention has been described with reference to different embodiments. However, the scope of the invention is not limited to the illustrated embodiments, and alterations and modifications may be carried out without deviating from the scope of the invention. For instance, in the figures, the first cable section 24 and the second cable section 26 are shown as two separate cables connected to the ring 42; however, the two cable sections 24, 26 may alternatively have the form of one cable, whereby the ring 42 is mounted at the middle, or whereby the ring 42 is omitted, so that the wires 44 are connected directly to the middle of said one cable. Furthermore, it is noted that although devices such as cables, slings, wires and belts are mentioned, the skilled person will understand that these types of devices are mentioned as examples only and may be interchangeable. Moreover, a cable is understood as a general expression meaning any kind of suitable wire, rope, sling, belt or the like.

LIST OF REFERENCE NUMERALS 2 wind turbine
4 tower
6 nacelle
7 top end of tower
8 hub
9 front end of nacelle
10 blade
14 tip region
16 root region
18 repair platform
20 fork-like structure
22 floor of repair platform
24 first cable section
26 second cable section
28 first end of cable sections
30 second end of cable sections
32 structure of the nacelle
34 first anchorage point of gear box
36 second anchorage point of gear box
38 peripheral surface of the hub
40 surface of the root region
42 ring
44 wire
46 wire
48 first end
50 second end
52 connection mechanism
54 central part of cable section
56 wire ring
58 door opening
60 roof of the nacelle

The invention claimed is:

1. A method of attaching a repair platform (18) to a wind turbine (2), the wind turbine comprising a tower (4), a nacelle (6) arranged at a top end (7) of the tower and including a structure (32), a hub (8) connected to a substantially horizontal rotor shaft and being located at a front end (9) of the nacelle (6) and at least three wind turbine blades (10A, 10B, 10C) each having a root region (16) connected to the hub (8), the method comprising positioning a first blade (10A) in substantially vertical position, connecting first ends (28) of a first and a second cable section (24, 26), respectively, to the structure (32), connecting second ends (30) of the first and the second cable section (24, 26), respectively, to the repair platform (18) and lifting the repair platform along said blade (10A) by means of the first and second cable sections (24, 26), and positioning the first and second cable sections (24, 26) so that they extend over the hub (8) and are supported at a distance from each other between root regions (16) of a second and a third blade (10B, 10C), respectively.

2. A method of attaching a repair platform to a wind turbine according to claim 1, whereby the first and second cable sections (24, 26) are positioned so that they are supported at the root regions (16) of the second and the third blade (10B, 10C), respectively.

3. A method of attaching a repair platform to a wind turbine according to claim 1, whereby the first and second cable sections (24, 26) are positioned so that they are supported directly on a peripheral surface (38) of the hub (8).

4. A method of attaching a repair platform to a wind turbine according to claim 1, whereby the first and second cable sections (24, 26) are positioned so that they are supported directly on a surface (40) of the root region (16) of the second and the third blade (10B, 10C), respectively.

5. A method of attaching a repair platform to a wind turbine according to claim 1, whereby the first and second cable sections (24, 26) are positioned so that they are supported directly on a surface of a second and a third root region mounting connection of the hub (8), respectively.

6. A method of attaching a repair platform to a wind turbine according to claim 1, whereby the second ends (30) of the first and second cable sections (24, 26), respectively, are connected to a ring (42) which is connected with the repair platform (18) by means of at least one wire (44), and whereby the ring (42) is positioned at the top end (7) of the tower (4) and below the hub (8) or at a root region (16) of the first blade (10A) in substantially vertical position.

7. A method of attaching a repair platform to a wind turbine according to claim 6, whereby the ring (42) is provided with a first and a second wire (46) each having first ends (48) fixed to the ring (42) and second ends (50) provided with a connection mechanism (52), by means of which the connection between the second ends (30) of the first and second cable sections (24, 26), respectively, and the ring (42) is established.

8. A method of attaching a repair platform to a wind turbine according to claim 6, whereby the ring (42) connected with the repair platform (18) by means of a wire (44) is lifted from the ground to the top end (7) of the tower (4) by means of a hoisting device, in order to connect the second ends (30) of the first and second cable sections (24, 26), respectively, to the ring (42).

9. A method of attaching a repair platform to a wind turbine according to claim 6, whereby the second ends (30) of the first and second cable sections (24, 26), respectively, are slung over a blade (10B, 10C) at either side of the hub (8) so that part of the cable sections (24, 26) are positioned at the root regions (16) of the second and third blades, respectively, and subsequently, the second ends (30) of the first and second cable sections (24, 26), respectively, are connected to the ring (42), thereby positioning the ring hanging in a position under the hub (8).

10. A method of attaching a repair platform to a wind turbine according to claim 9, whereby the first ends (28) of the first and second cable sections (24, 26), respectively, are connected with the structure (32) before that part of the cable sections (24, 26) are positioned at the root regions (16) of the second and third blades (10B, 10C), respectively.

11. A method of attaching a repair platform to a wind turbine according to claim 6, whereby the second ends (30) of the first and second cable sections (24, 26), respectively, are maintained at the top of the nacelle (6) as central parts (54) of both the first and second cable sections (24, 26), respectively, are slung over a blade (10B, 10C) at either side of the hub (8)

so that said central parts (54) of the cable sections are positioned at the root regions (16) of the second and third blades (10B, 10C), respectively, whereby, before or after slinging said central parts (54) of the cable sections (24, 26), the second ends (30) of the first and second cable sections (24, 26), respectively, are connected to the ring (42) which is connected with the repair platform (18) by means of a wire (44), and, after slinging said central parts (54) of the cable sections (24, 26), the ring (42) is slung over the hub (8), thereby positioning the ring (42) hanging in a position under the hub (8).

12. A method of attaching a repair platform to a wind turbine according to claim 6, whereby the ring (42) has the form of a solid steel ring and is accompanied by a wire ring (56) to which the first ends (48) of the first and second wires (46), respectively, are also fixed, and which is also connected with the repair platform (18) by means of the at least one wire (44).

13. A method of attaching a repair platform to a wind turbine according to claim 6, whereby the ring (42) is provided with a first and a second wire (46) each having first ends (48) fixed to the ring (42) and second ends (50) provided with a sling hook, by means of which the sling hook between the second ends (30) of the first and second cable sections (24, 26), respectively, and the ring (42) is established.

14. A method of attaching a repair platform to a wind turbine according to claim 6, whereby the ring (42) connected with the repair platform (18) by means of a wire (44) is lifted from the ground to the top end (7) of the tower (4) using a winch and a rope, in order to connect the second ends (30) of the first and second cable sections (24, 26), respectively, to the ring (42).

15. A method of attaching a repair platform to a wind turbine according to claim 1, whereby the first and second cable sections (24, 26) are lead through a door opening (58) in a roof (60) of the nacelle (6) or through an open nacelle roof in general in order to connect the first ends (28) of the first and second cable sections (24, 26) with the structure (32).

16. A method of attaching a repair platform to a wind turbine according to claim 1, whereby the structure (32) is a gear box, a generator or a nacelle frame and whereby, preferably, the first cable section (24) is connected to a first anchorage point (34) of the gear box, generator or nacelle frame and the second cable section (26) is connected to a second anchorage point (36) of the gear box, generator or nacelle frame.

17. A method of attaching a repair platform to a wind turbine according to claim 1, whereby the first and second cable sections (24, 26) have the form of textile slings, wires or belts, such as nylon wires or belts.

18. A method of attaching a repair platform to a wind turbine according to claim 1, whereby the second ends (30) of the first and second cable sections (24, 26), respectively, are connected to a ring (42) which is connected with the repair platform (18) by means of two wires (44), and whereby the ring (42) is positioned at the top end (7) of the tower (4) and below the hub (8) or at a root region (16) of the first blade (10A) in substantially vertical position.

* * * * *